United States Patent
Ruetter et al.

(10) Patent No.: US 6,879,148 B2
(45) Date of Patent: Apr. 12, 2005

(54) SEALING DEVICE WITH A SENSOR ADJACENT AN ENCODER WHEEL FOR A ROLLING BEARING

(75) Inventors: Andreas Ruetter, Pinerolo (IT); Claudio Savarese, Airasca (IT); Dino Bellion, Luserna San Giovanni (IT); Angelo Vignotto, Turin (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/087,250

(22) Filed: Mar. 1, 2002

(65) Prior Publication Data

US 2002/0125883 A1 Sep. 12, 2002

(30) Foreign Application Priority Data

Mar. 6, 2001 (IT) .......................................... 2001A0195

(51) Int. Cl.[7] .......................... G01P 3/44; G01P 3/487; F16C 32/00; F16J 15/32
(52) U.S. Cl. ................... 324/174; 324/207.25; 384/448
(58) Field of Search ............................... 324/166, 168, 324/173, 174, 207.25; 384/448

(56) References Cited

U.S. PATENT DOCUMENTS

| 4,948,277 | A | | 8/1990 | Alff |
| 5,523,681 | A | | 6/1996 | Hajzler et al. |
| 5,873,658 | A | * | 2/1999 | Message et al. ............ 384/448 |
| 5,898,388 | A | * | 4/1999 | Hofmann et al. ...... 340/870.31 |
| 5,969,518 | A | | 10/1999 | Merklein et al. ........... 324/173 |
| 6,559,633 | B1 | * | 5/2003 | Nachtigal et al. ........... 324/174 |

FOREIGN PATENT DOCUMENTS

| EP | 0 520 853 A1 | 12/1992 |
| EP | 0 553 716 A1 | 8/1993 |
| EP | 0 675 364 A2 | 10/1995 |
| FR | 2 574 501 | 6/1986 |

* cited by examiner

*Primary Examiner*—Jay Patidar
(74) *Attorney, Agent, or Firm*—Merchant & Gould P.C.

(57) ABSTRACT

Sealing device (1) with a sensor for a rolling bearing (2), in which the sealing shield (7) is mounted between two races of the rolling bearing (2), and a encoder wheel (8) is arranged inside the rolling bearing (2) between the two races and the shield (7); a detecting (9) sensor being arranged inside a housing (10) which is obtained through the shield (7) and which is also arranged with a respective detecting surface which directly faces the encoder wheel (8).

2 Claims, 1 Drawing Sheet

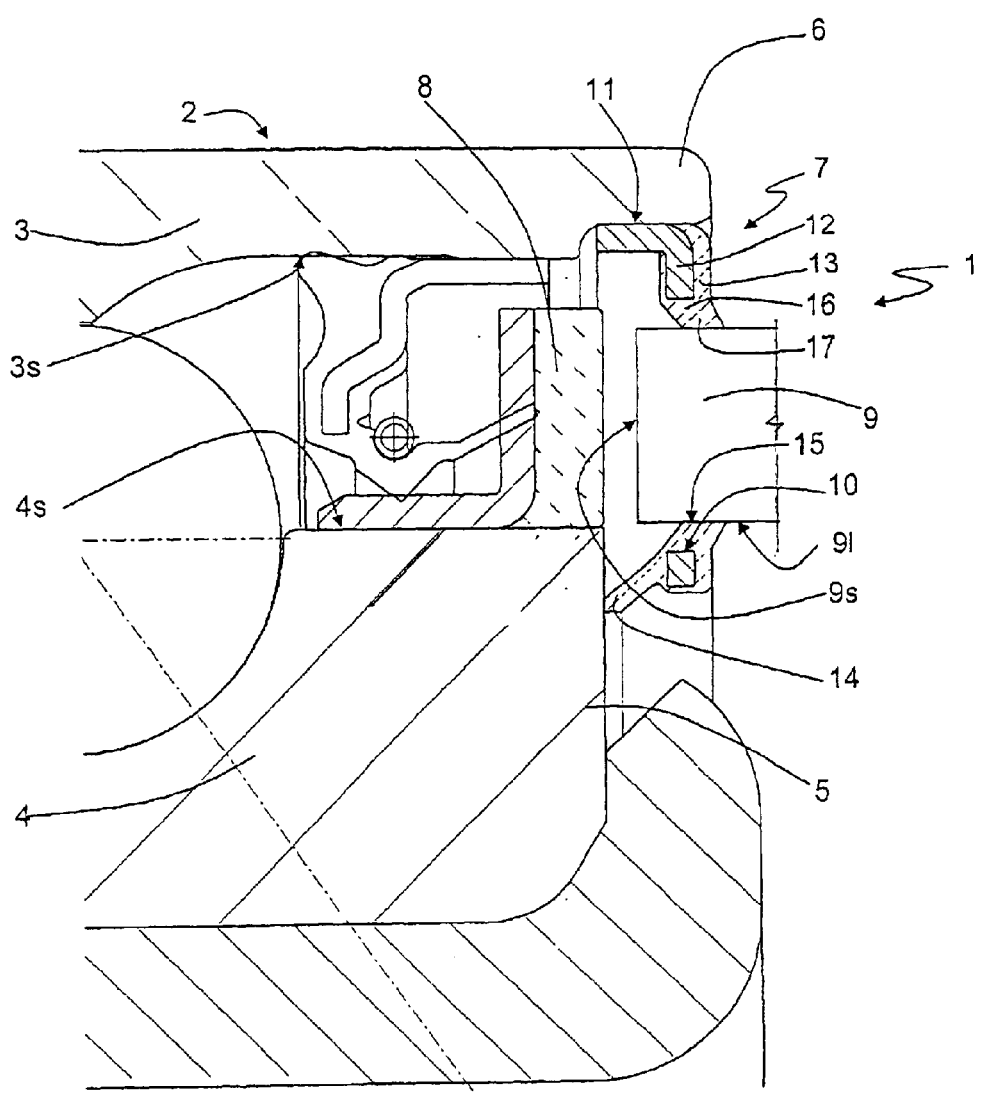

SEALING DEVICE WITH A SENSOR ADJACENT AN ENCODER WHEEL FOR A ROLLING BEARING

TECHNICAL FIELD

The present invention relates to a sealing device with sensor for a rolling bearing.

BACKGROUND

It should be pointed out that the present invention relates to a sealing device with sensor for a rolling bearing which comprises: a sealing shield which is mounted between the two races of the rolling bearing itself; an encoder wheel which is arranged between the same races and the shield; and a detecting sensor which is frontally arranged in relation to the encoder wheel in order to detect the movement of the encoder wheel itself.

A sealing device of the kind described above has been described in the U.S. Pat. No. 5,969,518, in which the shield is comprised of a substantially rigid shield which is mounted inside the outer race between the encoder wheel and the sensor, and it is made of non-ferromagnetic material with the aim of not interfering with the detection of the sensor itself.

The kind of sealing device which has just been described presents, however, some disadvantages in that the sensor is assembled outside the device itself, as well as which it presents a frontal detection surface which is arranged in substantial contact with the cited shield and which is opposite the encoder wheel in relation to the shield itself. When the assembly of the sensor is carried out in this fashion, it means that the sensor itself, and above all the relevant detection surface, is exposed to polluting agents which, in combination with the slight disturbance caused by the shield, result in a deterioration in the detection capability of the device.

On the other hand, the French patent No. 2 574 501 describes a sealing device in which the shield is defined by a rigid support which is mounted on the inner race of the rolling bearing, and which comprises a rubber lining which is connected to the rigid support and which extends in contact with the outer race, and which also comprises a substantially rigid race which is supported by a rigid support and which defines with the lining housing for the sensor. While this alternative protects the detection surface of the sensor from the inside of the housing, it also represents an improvement from this point of view with regard to the previously cited American patent but it also presents the disadvantage of having a barrier between the detection surface of the sensor and the encoder wheel and also has a further disadvantage in that the sensor is rigidly connected to the inner race of the rolling bearing and with the respective fixing support, which is usually arranged outside the rolling bearing and which is connected to an element which is unrelated to the structure of the rolling bearing itself.

In fact, both the presence of a barrier between the detection surface of the sensor itself and the encoder wheel, as well as the fixing of the sensor along a non-homogenous rigid chain has an outcome, in various ways and to various degrees, on the quality of the detection of the sensor itself.

SUMMARY

The aim of the present invention is to produce a sealing device with sensor for rolling bearings which will resolve the above-described disadvantages in a simple and cost-effective fashion.

According to the present invention, a sealing device with sensor for a rolling bearing will be produced comprising a sealing shield which is mounted between two races of the rolling bearing, and which also comprises a encoder wheel which is arranged inside the rolling bearing between the two races and the shield, and also comprises a detecting sensor which is arranged frontally in relation to the encoder wheel in a respective housing which is presented by the shield; the sealing device is characterised by the fact that the sensor comprises a detection surface and is positioned inside the housing in such a way that the detection surface directly faces the encoder wheel.

DESCRIPTION OF THE DRAWING

The present invention will now be described with reference to the attached drawing, which illustrate an axial section of a preferred form of embodiment of the present invention which is provided as a non-limiting example of a form of embodiment of the present invention.

With regard to the attached drawing, the number 1 indicates a sealing device with sensor for a rolling bearing in its entirety.

DETAILED DESCRIPTION

The rolling bearing 2 comprises an outer race 3 which is fixed to an inner race 4 and which revolve coaxial to each other and which are respectively delimited by an internal cylindrical surface 3s and by an external cylindrical surface 4s which face each ocher at least in correspondence to an external lateral portion 5 of the rolling bearing 2 itself. Furthermore, the outer race e presents, in correspondence with the portion 5, an annular outline 6, which axially projects towards the outside of the rolling bearing 2 in relation to the inner race 4.

The device 1 comprises a sealing shield 7 which is mounted between the two races 3 and 4 of the rolling bearing 2 in correspondence with the outline 6, and a encoder wheel 8, which is arranged inside the rolling bearing 2 between the two surfaces 3s and 4s and the shield 7, and which is mounted on the inner race 4 in order to rotate integrally with the inner race 4 itself. Finally, the device 1 comprises a detection sensor 9, which is frontally arranged in relation to the encoder wheel 8, and which is housed in an housing 10 which is obtained through the shield 7.

The shield 7 comprises a substantially rigid support element 11, which is arranged in contact with the surface 3s in correspondence with the outline 6 and which presents an annular wall 12 which is transverse to the surface 3s and through which the housing 10 is obtained. Furthermore, the shield 7 comprises a sealing lining 13 which is made of substantially elastic material, and which completely lines the two sides of the wall 12, and which presents a lip 14 which extends from the wall 12 itself towards the inner race 4 and which comes into contact with it.

In correspondence to the housing 10, the lining 13 presents a substantially annular window 15 which is completely crossed by the sensor 9, one detection surface 9s of which is arranged in the gap which occurs between the shield 7 and the encoder wheel 8 in order to directly face the encoder wheel 8 without the interposition of any kind of barrier at all.

More particularly, the window 15 is delimited by an elastic support wall 16 which supports the sensor 9 in a stable operating configuration in which the surface 9s precisely faces the encoder wheel 8 directly. Furthermore, the wall 16 comprises a continuous sealing lip 17, which is arranged in direct contact with a lateral surface 91 of the sensor 9, and which presents a substantially conical conformation with its own top end facing opposite the rolling bearing 2 in relation to the shield 7.

It is obvious from the above description that the assembly of the sensor 9 via the sealing lip 17 means that the surface 9s directly faces the sensor 9 itself, and that it is also possible to create a cushioned connection between the sensor 9 and the rolling bearing 2 which is only to the advantage of the quality of the detection.

It is intended that the present invention should not be limited to the form of embodiment herein described and illustrated, which is to be considered as an example of a form of embodiment of a sealing device with sensor for a rolling bearing, which may be subject to further modifications in relation to the shape and disposition of the parts, as well as further modifications in relation to details pertaining to construction and assembly.

What is claimed is:

1. Sealing device with a sensor for a rolling bearing, the sealing device comprising:

a sealing shield which is mounted between two races of the rolling bearing;

an encoder wheel which is arranged inside the rolling bearing between the two races and the shield; and a detecting sensor comprising a detection surface which is arranged frontally in relation to the encoder wheel in a respective housing which is presented by the shield; and wherein the housing comprises an elastic support wall which supports the sensor in a stable operating configuration suitable for detecting, in which the detection surface directly faces the encoder wheel, wherein said wall defines a substantially annular window through said shield and which is made of substantially elastic material.

2. Device according to claim 1, wherein said shield comprises a support element which present a rigidity which is greater than a rigidity of said support wall, and which is arranged in substantial contact with one of said two races.

* * * * *